(12) United States Patent
Nasiri et al.

(10) Patent No.: US 6,351,996 B1
(45) Date of Patent: Mar. 5, 2002

(54) HERMETIC PACKAGING FOR SEMICONDUCTOR PRESSURE SENSORS

(75) Inventors: Steven S. Nasiri, Saratoga; David W. Burns, San Jose; Janusz Bryzek, Fremont; Sean S. Cahill, Palo Alto, all of CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 09/191,718

(22) Filed: Nov. 12, 1998

(51) Int. Cl.$^7$ .............................. G01L 9/04; G01L 7/00
(52) U.S. Cl. ...................................................... 73/706
(58) Field of Search ................... 73/706, 756, 715–727

(56) References Cited

U.S. PATENT DOCUMENTS

| | | |
|---|---|---|
| 3,247,719 A | 4/1966 | Chelner |
| 3,328,649 A | 6/1967 | Rindner et al. |
| 3,739,315 A | 6/1973 | Kurtz et al. |
| 3,994,009 A | 11/1976 | Hartlaub |
| 4,019,388 A | 4/1977 | Hall, II et al. |
| 4,023,562 A | 5/1977 | Hynecek et al. |
| 4,033,787 A | 7/1977 | Marshall |
| 4,040,297 A | 8/1977 | Karsmakers et al. |
| 4,050,049 A | 9/1977 | Youmans |

(List continued on next page.)

FOREIGN PATENT DOCUMENTS

| | | |
|---|---|---|
| DE | 4227893 | 4/1993 |
| EP | 0 500 234 A2 | 8/1992 |
| EP | 0 630 868 A1 | 12/1994 |
| JP | 58039069 | 3/1983 |
| JP | 60233863 | 11/1985 |
| JP | 08153816 | 6/1996 |
| JP | 09126921 | 5/1997 |
| WO | 96/26424 | 8/1996 |

*Primary Examiner*—William Oen
(74) *Attorney, Agent, or Firm*—Blakely, Sokoloff, Taylor & Zafman LLP

(57) ABSTRACT

A hermetic media interface for a sensor package is disclosed. Preferably, the hermetic media interface is incorporated into a pressure sensor package for interfacing directly to fluid and/or gaseous media. In one embodiment, the pressure sensor package includes a semiconductor die and a pressure port that are housed in a pre-molded plastic package. A eutectic solder is coupled between the semiconductor die and the pressure port to solder the same to the semiconductor die. The semiconductor die may be metallized to enhance solderability. In an alternative embodiment, the pressure port is made from one or more plastic materials and the pressure port is attached to the semiconductor die with an adhesive. An integral stress-isolation region may optionally be incorporated on the semiconductor die.

37 Claims, 5 Drawing Sheets

U.S. PATENT DOCUMENTS

| | | | |
|---|---|---|---|
| 4,125,820 A | 11/1978 | Marshall | |
| 4,129,042 A | 12/1978 | Rosvold | |
| 4,229,979 A | 10/1980 | Greenwood | |
| 4,236,137 A | 11/1980 | Kurtz et al. | |
| 4,241,325 A | 12/1980 | Di Giovanni | |
| 4,276,533 A | 6/1981 | Tominaga et al. | |
| 4,295,115 A | 10/1981 | Takahashi et al. | |
| 4,317,126 A | 2/1982 | Gragg, Jr. | |
| 4,399,707 A * | 8/1983 | Wamstad | 73/727 |
| 4,467,656 A | 8/1984 | Mallon et al. | |
| 4,502,335 A | 3/1985 | Wamstad et al. | |
| 4,609,966 A | 9/1986 | Kuisma | |
| 4,655,088 A | 4/1987 | Adams | |
| 4,656,454 A | 4/1987 | Rosenberger | |
| 4,665,754 A | 5/1987 | Glenn et al. | |
| 4,686,764 A | 8/1987 | Adams et al. | |
| 4,737,756 A | 4/1988 | Bowman | |
| 4,763,098 A | 8/1988 | Glenn et al. | |
| 4,771,639 A | 9/1988 | Saigusa et al. | |
| 4,773,269 A | 9/1988 | Knecht et al. | |
| 4,790,192 A | 12/1988 | Knecht et al. | |
| 4,800,758 A | 1/1989 | Knecht et al. | |
| 4,842,685 A | 6/1989 | Adams | |
| 4,879,903 A | 11/1989 | Ramsey et al. | |
| 4,905,575 A | 3/1990 | Knecht et al. | |
| 4,918,992 A | 4/1990 | Mathias | |
| 4,942,383 A | 7/1990 | Lam et al. | |
| 4,972,716 A | 11/1990 | Tobita et al. | |
| 4,996,627 A | 2/1991 | Zias et al. | |
| 5,064,165 A | 11/1991 | Jerman | |
| 5,142,912 A | 9/1992 | Frische | |
| 5,156,052 A | 10/1992 | Johnson et al. | |
| 5,157,972 A | 10/1992 | Broden et al. | |
| 5,172,205 A | 12/1992 | French et al. | |
| 5,174,156 A | 12/1992 | Johnson et al. | |
| 5,177,579 A | 1/1993 | Jerman | |
| 5,178,015 A | 1/1993 | Loeppert et al. | |
| 5,184,107 A | 2/1993 | Maurer | |
| 5,186,055 A | 2/1993 | Kovacich et al. | |
| 5,188,983 A | 2/1993 | Guckel et al. | |
| 5,209,118 A | 5/1993 | Jerman | |
| 5,220,835 A | 6/1993 | Stephan | |
| 5,257,546 A | 11/1993 | Tobita et al. | |
| 5,295,395 A | 3/1994 | Hocker et al. | |
| 5,333,504 A | 8/1994 | Lutz et al. | |
| 5,412,994 A | 5/1995 | Cook et al. | |
| 5,438,877 A | 8/1995 | Vowles et al. | |
| 5,454,270 A * | 10/1995 | Brown et al. | 73/720 |
| 5,459,351 A | 10/1995 | Bender | |
| 5,465,626 A | 11/1995 | Brown et al. | |
| 5,477,738 A | 12/1995 | Tobita et al. | |
| 5,483,834 A | 1/1996 | Frick | |
| 5,509,312 A | 4/1996 | Donzier et al. | |
| 5,515,732 A | 5/1996 | Willcox et al. | |
| 5,539,236 A | 7/1996 | Kurtz et al. | |
| 5,600,071 A | 2/1997 | Sooriakumar et al. | |
| 5,646,072 A | 7/1997 | Maudie et al. | |
| 5,684,253 A | 11/1997 | Bonne et al. | |

* cited by examiner

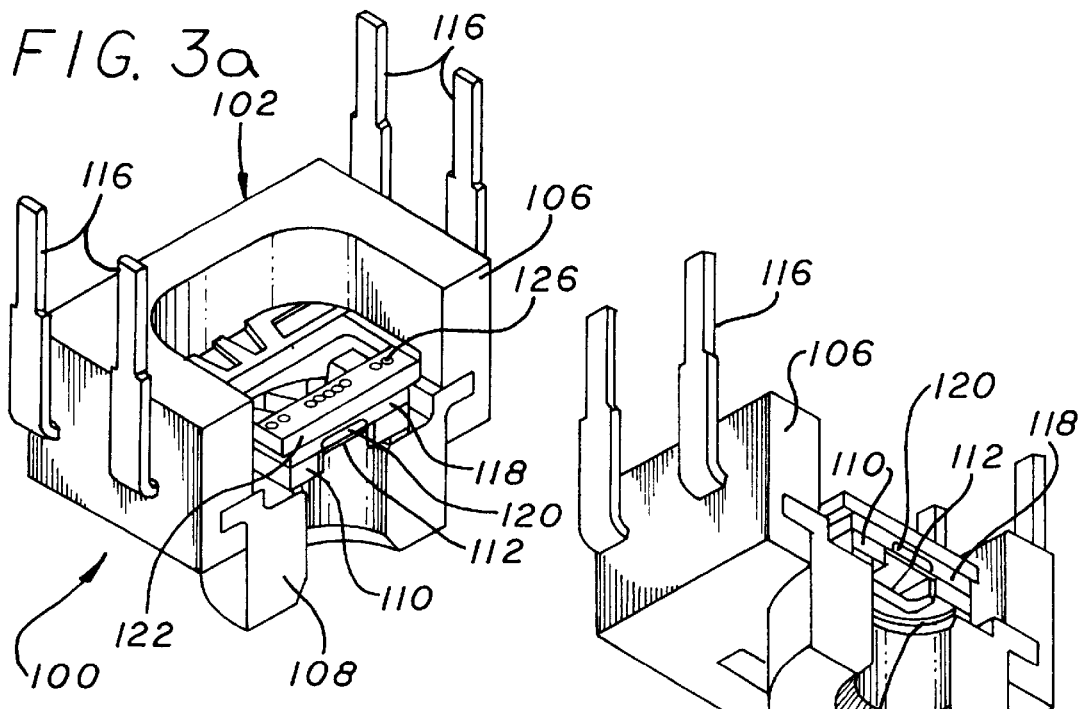
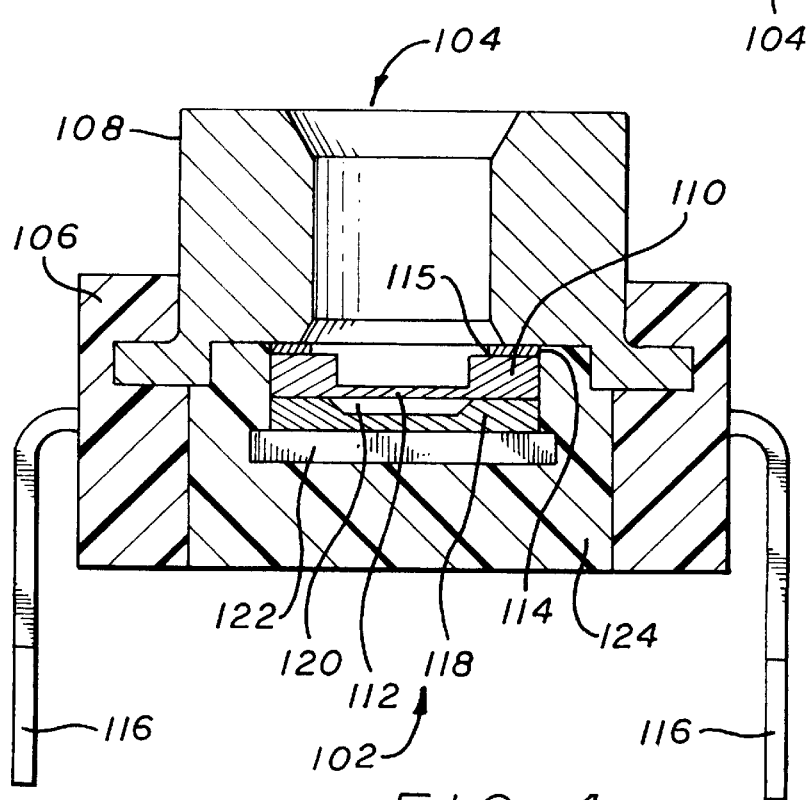

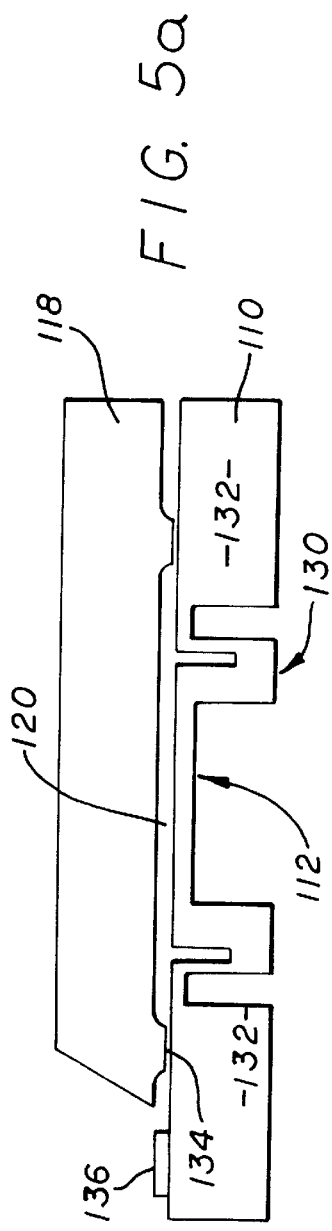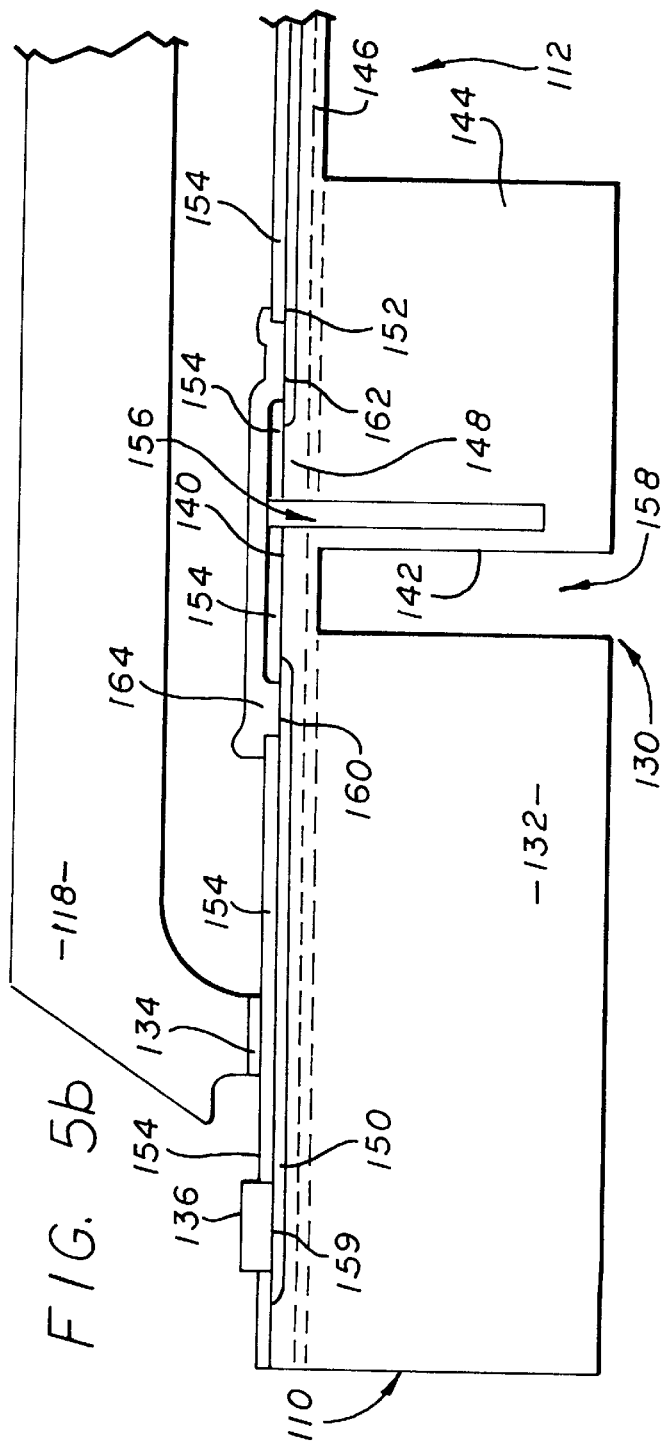

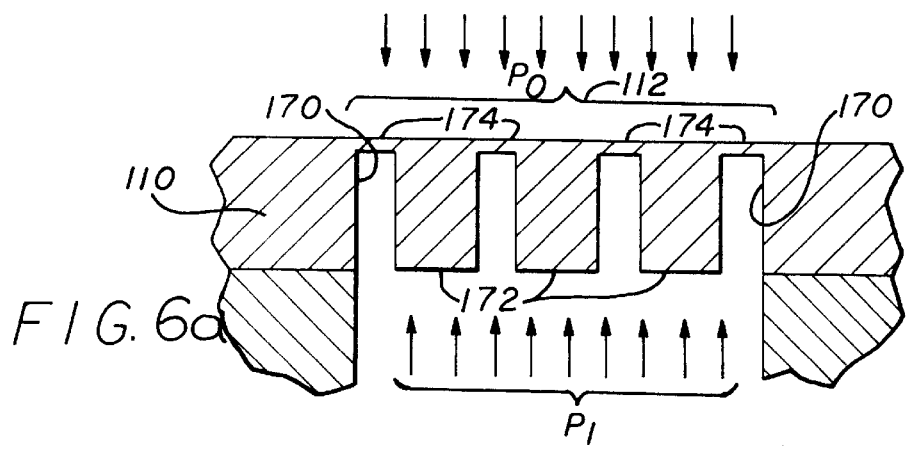
FIG. 6a
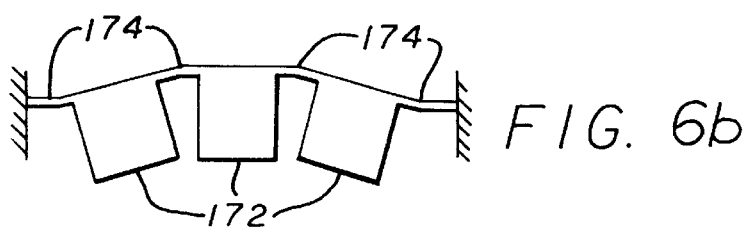
FIG. 6b
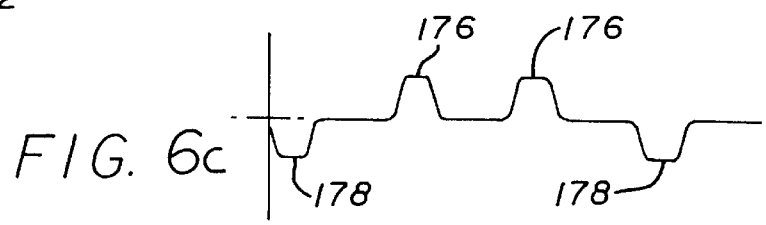
FIG. 6c
FIG. 6d
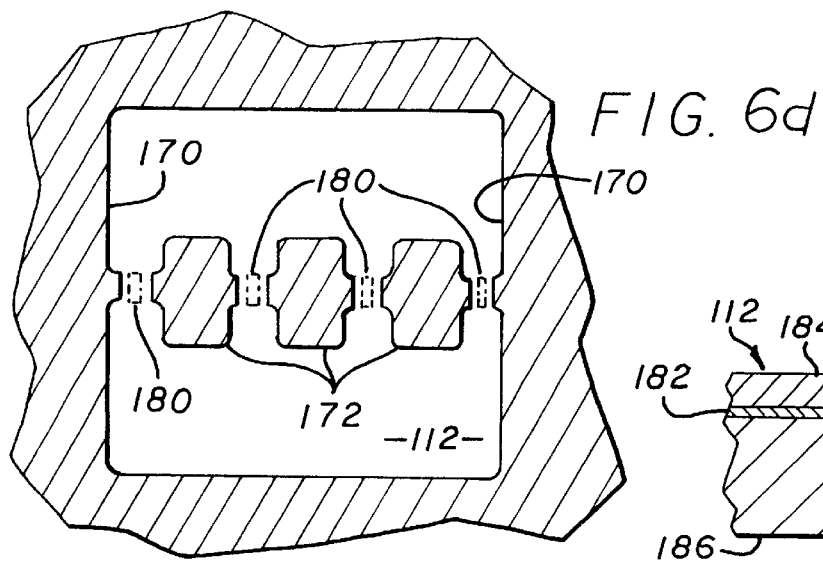
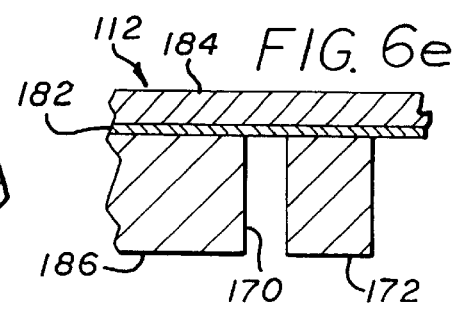
FIG. 6e

HERMETIC PACKAGING FOR SEMICONDUCTOR PRESSURE SENSORS

BACKGROUND OF THE INVENTION

1. Field of the Invention

The present invention relates generally to semiconductor pressure sensors, and specifically, to hermetic packaging of semiconductor pressure sensors.

2. Background Information

Today, most low-cost pressure sensor packages are designed to address clean gases and/or non-aggressive fluids. FIG. 1 is a prior-art molded leadframe pressure sensor package 1. The sensor package 1 includes a sensor die 2 that is attached to a housing 3 by a soft adhesive (e.g., RTV, epoxy, etc.), as shown by numeral 4. The sensor package housing 3 is generally made out of a pre-molded plastic and includes a metal leadframe 5 for providing interconnection to external circuitry. The topside 11 of the pressure sensor is typically coated with a silicone gel 6 for communicating pressure from external gaseous media. The package further includes a lid 7 having an opening 8 for directing external pressure to the sensor. The silicone gel 6 provides a minimal amount of protection from gaseous media for the sensor, wire interconnects, etc. In the case of an absolute pressure sensor, pressure is applied from the topside 11, whereas for gage or differential pressure sensing, a pressure port 10 is provided on the bottom side 12.

However, this sensor package 1 has several drawbacks. First, since the sensor die 2 is attached to the housing 3 with a soft die attach material, the applied pressures from the bottom side 12 of the sensor die is typically limited to less than 150 pounds per square inch ("psi"). Second, the topside 11 of the sensor only supports inert gaseous media with pressures limited again to less than 150 psi. This is because the pressure media that is applied to the topside 11 of the sensor will penetrate the intermediary coating (e.g., the silicone gel or other type of coating), causing reliability issues such as failure of the sensor over time or explosion of the silicone gel after rapid pressure changes. Third, the only use of fluid media with the sensor includes exposure to the fluid media from the bottom side 12 of the sensor. However, adhesives, soft or hard, are not considered hermetic and, over time, moisture and corrosive gases will penetrate the interface, causing the electronics of the pressure sensor to fail.

FIG. 2 is a typical prior art sensor package 20 for high pressure and fluid media compatibility. This type of sensor package 20 includes a sensor die 21 which is placed in a stainless steel housing 22 with hermetic glass feed-through pins 23. The sensor die 21 has an integral glass or silicon constraint bottom 24 which provides a sealing cavity 25 therebetween for a vacuum reference and stress isolation from the housing. The die attach material is typically a soft epoxy such as RTV. A metal diaphragm 26 is welded to the stainless steel housing 22 and an inside cavity 27 formed therein is filled with oil to allow transfer of pressure to the sensor die 21. This configuration isolates the sensor die 21 from the fluid media. The use of the metal diaphragm is the primary packaging technique available today for more demanding applications, with variations in pressure and ability to apply most fluids to the sensor package. However, this type of package only generally addresses specific applications and is very expensive.

Accordingly, there is a long-felt need in the sensor industry for a low-cost, long-term reliable solution to address the problems associated with conventional pressure sensors.

SUMMARY OF THE INVENTION

The present invention is a hermetic media interface for a sensor package. The hermetic media interface is incorporated into a pressure sensor package for interfacing directly to fluid and/or gaseous media. The pressure sensor package includes a semiconductor die and a pressure port that are housed in a pre-molded plastic package. In one embodiment, a eutectic solder is coupled between the semiconductor die and a metal pressure port to solder the same to the semiconductor die. The semiconductor die may be optionally metallized. In an alternative embodiment, the pressure port is made from one or more plastic materials and the pressure port is attached to the semiconductor die with an adhesive. An integral stress-isolation region may be optionally incorporated on the semiconductor die.

BRIEF DESCRIPTION OF THE DRAWINGS

FIGS. 3a and 3b illustrate cut-away top and bottom views of a silicon pressure sensor package according to one embodiment of the present invention.

FIG. 4 illustrates a cross-sectional view of the silicon pressure sensor package of FIG. 3 where the pressure sensor die is also over-coated.

FIG. 5a is a schematic cross section of the sensor die bonded to the silicon cap according to one embodiment of the present invention.

FIG. 5b is a schematic cross-sectional view of a portion of the sensor die and silicon cap of FIG. 5a, taken on an expanded scale.

FIGS. 6a through 6e illustrate a triple boss diaphragm configuration according to another embodiment of the present invention.

DETAILED DESCRIPTION

Figure 1:
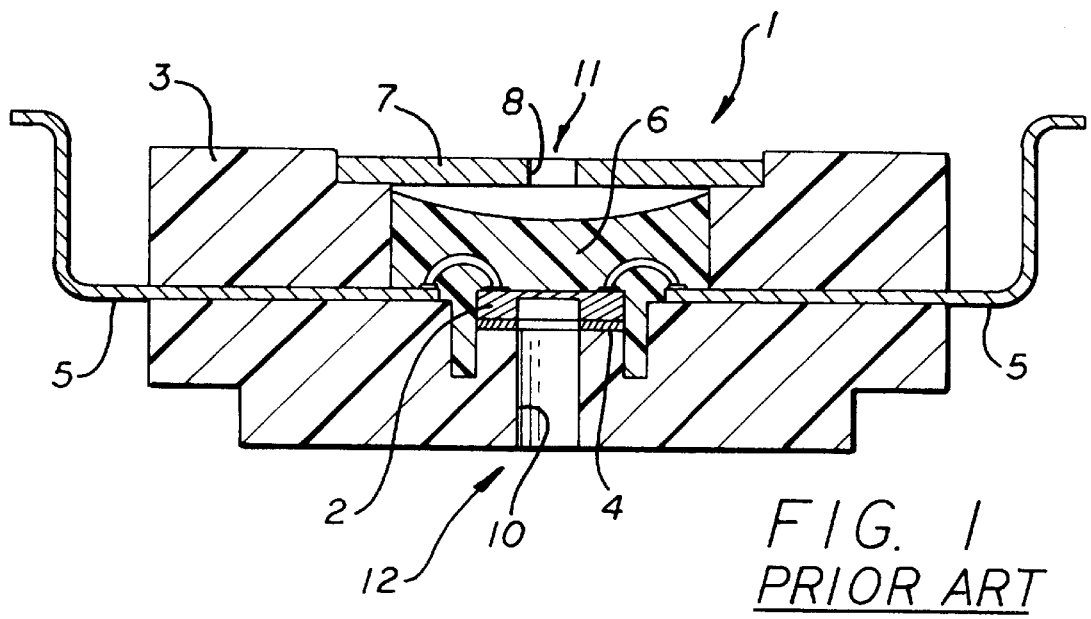
FIG. 1 is a prior-art molded leadframe pressure sensor package.
Figure 2:
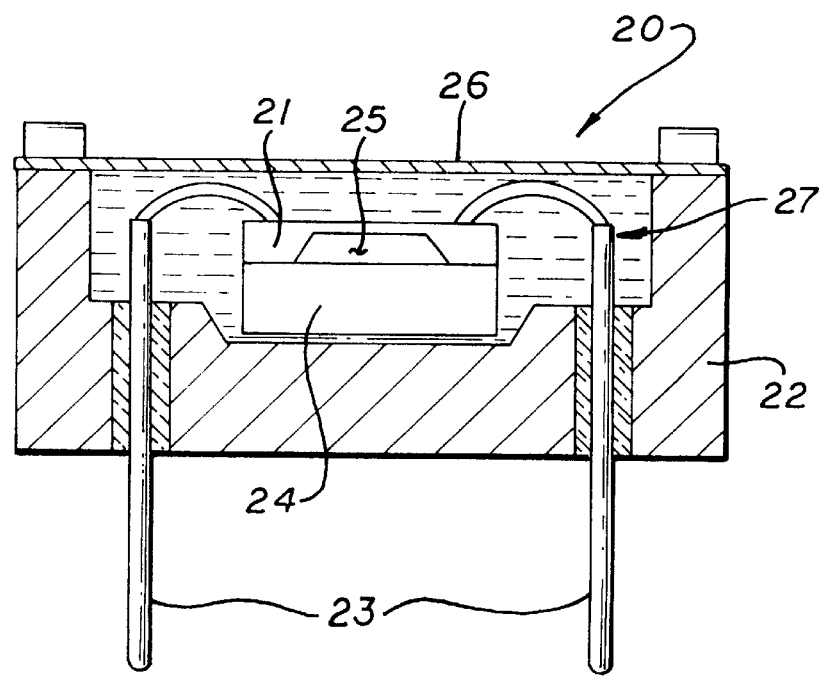
FIG. 2 is a typical prior-art sensor package for high pressure and media compatibility.

The present invention is a hermetic media interface for a sensor package. In one embodiment, the hermetic media interface is incorporated into a pressure sensor package for interfacing directly to fluid and/or gaseous media. The pressure sensor package allows fluid media (e.g., water, gasoline, saline, etc.) and/or gaseous media to be applied directly to the back of the pressure sensor die without incurring pressure leaks as a result of the hermetic media interface.

FIGS. 3a and 3b illustrate cut-away top and bottom views of a silicon pressure sensor package 100 according to one embodiment of the present invention. FIG. 4 illustrates a cross-sectional view of the silicon pressure sensor package of FIG. 3 where the pressure sensor die is also over-coated. Referring to FIGS. 3 and 4, the silicon pressure sensor package 100 has a top side 102, housing the electronics of the pressure sensor, and a bottom side 104 which is exposed to the pressure media (e.g., gaseous, fluid, etc.). The pressure sensor package 100 comprises a molded plastic housing 106 which embodies a metal insert 108 (hereinafter referred to as a "pressure port"). Alternatively, the pressure port 108 is molded into the plastic housing 106. This allows the pressure port 108 to be configured into different shapes and sizes to maintain compatibility with different interfaces. In one embodiment, the housing 106 is made from liquid crystal polymer ("LCP") plastic materials. Moreover, the pressure port 108 is made from Invar 36, kovar, brass or a combination of such materials. The pressure port 108 is plated with electroless nickel, and optionally gold, for providing corrosion resistance and solderability. Alternatively, the pressure port 108 may be made from plastic material(s).

The silicon pressure sensor package 100 further comprises a sensor die 110 that includes a diaphragm 112. A plurality of piezoresistive elements (see, e.g., FIG. 6d) is disposed on the diaphragm 112 for sensing external pressure. The pressure port 108 provides a hermetic path for fluids to a backside 115 of the sensor die 110. A preform solder washer 114 (ring), is provided for soldering and hermetically attaching the sensor die 110 directly to the pressure port 108. In one embodiment, the preform solder washer 114 contains a combination of tin and silver, and preferably 96.5% tin and 3.5% silver having a eutectic melting point of 210° C. In another embodiment, the preform solder washer 114 contains a combination of gold and tin, and preferably 80% gold and 20% tin having a eutectic reflow temperature of 280° C. In the case where the pressure port 108 is made from plastic material(s), the pressure port 108 is attached to the sensor die 110 by an adhesive such as, but not limited or restricted to, RTV, epoxy, etc.

The backside 115 of the sensor die 110 may optionally be metallized with chromium and platinum for enhancing solderability and providing protection against exposure to fluids. The molded plastic housing 106 also embodies a metal leadframe 116 for externally interconnecting the circuitry contained within the silicon pressure sensor package 100. The metal leadframe 116 may optionally be made from Alloy 42, and optionally plated with electroless nickel and gold.

The sensor die 110 is bonded to a silicon cap 118 having a recess that forms a cavity 120 therebetween for allowing the diaphragm 112 to deflect responsive to applied pressure, and for providing a vacuum pressure reference. The silicon cap 118 may be optionally bonded to active electronic circuitry 122 (e.g., an application specific integrated circuit "ASIC") for providing amplification and signal correction. An exemplary active electronic circuitry includes electronically trimmable circuitry which negates the need for laser trimming. As shown in FIG. 3a, the active electronic circuitry 122 includes one or more pads 126 for connecting the active electronic circuitry to the leadframe 116. A conformal coating 124 (e.g., RTV material 6611, epoxy, parylene, etc.) is applied to the topside 102 of the sensor for completing the sensor package and protecting the electronics contained therein.

The silicon pressure sensor package 100 is capable of withstanding high pressures and is extremely reliable due to its hermeticity. Therefore, there is very little risk of fluid contamination to the electronic side and the wire bond areas of the sensor package.

FIG. 5a is a schematic cross section of the sensor die 110 bonded to the silicon cap 118 according to one embodiment of the present invention. As shown in FIG. 5a, the sensor die 110 includes the diaphragm 112 and an integral stress isolation flexible region 130. The stress isolation region 130 protects and isolates the diaphragm 112 from thermal and mounting stresses in the peripheral (or frame) region 132 of the sensor die 110. The flexible diaphragm 112 includes piezoresistive elements (See FIG. 6d) for sensing bending stresses from pressure applied to the diaphragm 112. A bond ring 134 is used to hermetically attach the cap 118 to the sensor die 110 and form a vacuum cavity 120 therebetween for providing an absolute pressure reference. By way of illustration, the bond ring 134, comprising aluminum, gold, or polysilicon, may be formed on the sensor die 110, while the silicon cap 118 may be coated with germanium, uncoated, or gold coated, respectively. The bond is formed at the wafer level by placing the two wafers in physical contact under elevated temperature and pressure.

FIG. 5b is a schematic cross-sectional view of a portion of the sensor die 110 and silicon cap 118 of FIG. 5a, taken on an expanded scale. As shown in FIG. 5b, the stress isolation flexible region 130 includes a horizontal member 140 integral with the frame region 132, and a vertical member 142 having a first end integral with a second end of the horizontal member 140, and a second end integral with a rim region 144. Prior to formation of the horizontal and vertical members 140 and 142, and the diaphragm 112, an oxide layer 146 is formed on the silicon substrate sensor die 110 using, for example, a Silicon Implanted with Oxygen ("SIMOX") or Bonded and Etched Silicon-on-Insulator ("BESOI") technique commonly known in the art. The oxide layer 146 provides a suitable etch stop for a bottom side etch. A silicon epitaxial layer 148 (e.g., N-) is then deposited, as needed, above the oxide layer 146 to increase the thickness of the diaphragm 112. Moderately doped P-type layers 150 and 152 are formed in the epitaxial layer 148.

A second oxide layer 154 is disposed over the epitaxial layer 148 extending across the width of the sensor die 110. After depositing the second oxide layer 154, the upper trench 156 is formed, as will be described in more detail below. The second oxide layer 154 is etched in at least three places including an etch on the outside of the bond ring 134, as shown by numeral 159, and at both sides of the stress isolation region 130, as shown by numerals 160 and 162. A pad 136 is placed over the etch 159 outside of the bond ring 134, and a metal interconnect layer 164 is placed between etches 160 and 162. The doped P-type layer 150 connects the metal interconnect layer 164 at numeral 160, under the bond ring 134, to the pad 136. The doped P-type layer 152 connects the metal interconnect layer 164 at numeral 162 to circuitry in the diaphragm region 112 such as a piezoresistive element (See FIG. 6d). This provides interconnection between the piezoresistive elements disposed on the diaphragm 112 (and other circuitry inside the bond ring 134) and one or more pads 136 outside of the bond ring 134. The second oxide layer 154 also isolates the P-type layer 150 from the eutectic bond ring 134.

The horizontal and vertical members 140 and 142 are formed by vertically etching upper and lower trenches 156 and 158 from the top and the bottom of the sensor die 110, respectively. A series of silicon and oxide etch steps are utilized to complete the upper trench 156. Formation of the horizontal and vertical members 140 and 142 is achieved using an etching process such as, but not limited or restricted to, deep reactive ion etching ("D-RIE") of silicon, a known etching technique which allows deep trenches to be etched in silicon with high aspect ratios and nearly vertical walls on each side of the wafer. The pressure-sensitive diaphragm 112 can also be etched using the D-RIE technique, and may be done at the same time as the backside etch used to form the horizontal member 140.

Accuracy in the thickness of the horizontal member 140 and deformable diaphragm 112 is enhanced by the inclusion of the oxide layer 146 at a depth from the top surface equal to the desired thickness of the diaphragm, since the etch rate of such oxide is much slower than that of bulk silicon. Though silicon-on-insulator ("SOI") material is used in cases where a thin, highly uniform diaphragm 112 is desired, standard material (non-SOI) may be used in conjunction with a timed etch to provide a thicker diaphragm. Electric discharge machining or other micromachining techniques may also be used to form the flexible horizontal and vertical members 140 and 142, if desired.

In one embodiment, the horizontal and vertical members 140 and 142 each have an aspect ratio (length to thickness) of approximately 10 to 1. That is, the length of each member is approximately ten times the thickness of the respective member, thereby providing good flexibility to confine externally generated stresses to the frame region 132 only. Other aspect ratios, as low as 1:1 or greater than 10:1, may be used depending on a number of factors including, but not limited to, the amount of stress that the frame region 132 may be subjected to, the thickness of the diaphragm 112, etc. The stress isolation flexible region 130 so formed is integral with the outer frame region 132. The horizontal and vertical members 140 and 142 support a nominally rigid rim region 144 with the same providing an isolated, rigid support for the pressure-sensitive diaphragm 112.

Referring now to FIG. 6a, a cross-sectional view of a triple boss diaphragm configuration of the sensor die 110 may be seen. This is an alternative embodiment of the diaphragm 112 shown in FIGS. 4, 5a, and 5b. In this embodiment, the diaphragm 112 is formed in the silicon sensor die 110 and is structurally supported at its periphery 170. The diaphragm 112 is exposed to applied pressure on one or both sides (e.g., P1 and/or P0). The diaphragm 112 is substantially planar and includes three nominally rigid members 172 (hereinafter referred to as "bosses") of increased thickness arrayed across the midsection or axis of the pressure sensor (see, e.g., FIG. 6d).

In the embodiment shown, the bosses 172 are equally spaced apart from the periphery 170 and each other. However, this is not a requirement as the bosses 172 may be spaced apart in unequal increments. The regions 174 between the bosses 172 and between a boss 172 and the periphery 170 have a smaller thickness than the thickness of the bosses 172 and are hereinafter referred to as "thinner regions". The bosses 172 locally stiffen the diaphragm 112 and focus the bending stresses on the thinner regions 174.

FIG. 6b illustrates the displacement profile of the triple boss diaphragm configuration of FIG. 6a. Although this figure is greatly exaggerated, the amount of diaphragm bending is much higher in the thinner regions 174 than the negligible bending in the regions stiffened by the bosses 172. FIG. 6c illustrates the stress profile along the upper surface of the diaphragm. The stress profile is associated with the bending profile of FIG. 6b. As shown in FIG. 6c, high tensile stresses 176 are found in the thinner regions 174 between the bosses 172 and high compressive stresses 178 are found in the thinner regions next to the diaphragm periphery 170. It is these thinner regions 174 where the piezoresistive elements are selectively positioned, as shown in FIG. 6d.

FIG. 6d illustrates a backside view of the triple boss diaphragm configuration. In this view, four piezoresistive elements 180 are shown for clarity purposes only, as they are actually disposed on the topside of the diaphragm 112. In the embodiment being described, two of the piezoresistive elements are located in the thinner regions of tensile stress (between the bosses 172) and the other two are located in the thinner regions of compressive stress (between a boss 172 and periphery 170). In one embodiment, the piezoresistive elements are formed in the middle of the thinner regions. This balances any effects of stress from the bosses 172. The piezoresistive elements 180 are connected in a Wheatstone bridge configuration (not shown).

Note that the piezoresistive elements 180 are all similarly aligned, i.e., they are either all parallel to the diaphragm edges 170 (as depicted) or all perpendicular to the diaphragm edges 170. In operation, a bias voltage is applied to the Wheatstone bridge. Orienting the piezoresistive elements 180 in the same direction cancels out common-mode stress effects due to packaging and mounting stresses while still providing high sensitivity. Axial stresses (horizontal and/or vertical) from packaging and temperature effects vary the resistance values of the four piezoresistive elements in the same way, thereby canceling such unwanted effects. A pressure differential across the diaphragm 112 causes the resistances of the two piezoresistive elements in opposite legs of the Wheatstone bridge to increase, and the resistances of the other two piezoresistive elements to decrease, resulting in a differential output voltage of the Wheatstone bridge which is a direct measure of the applied pressure.

FIG. 6e illustrates a cross-sectional view of a single boss, according to the embodiment of FIG. 6a. Referring to FIG. 6e, the diaphragm 112 (a portion of which is shown) is formed by first incorporating an oxide layer 182 on the substrate 110, disposing a silicon layer 184 on the oxide layer 182 by a wafer bonding and etch-back technique, and masking and etching the back side 186 of the substrate 110 to form the diaphragm 112. The buried oxide layer 182 acts as an automatic etch stop to provide uniformity in the depth of the etch. In a preferred embodiment, the substrate 110 is etched from the back side 186 using the D-RIE technique to form substantially vertical sidewalls of the bosses 172. For high-pressure designs, the area of the diaphragm may be decreased and/or its thickness may be increased. An epitaxial silicon layer, for example, may be deposited on the silicon layer 184 to achieve this additional thickness. For higher-pressure ranges, where the diaphragm 112 is thicker, the etch stop oxide layer 182 may not be required.

The triple boss configuration provides improved pressure non-linearity with a large output signal in response to applied pressure, while providing a higher degree of common-mode cancellation of detrimental effects due to temperature, package induced stresses, and mounting stresses. Furthermore, the multiple boss configuration (e.g., three bosses) focuses the stress between the bosses to provide stress amplification therebetween, produces identical "in-board" and "outboard" stresses except for sign, and provides high curvature in the thinner regions 174 between the bosses and between a boss and the periphery with low curvature in the boss and rim regions.

Figure 7A:
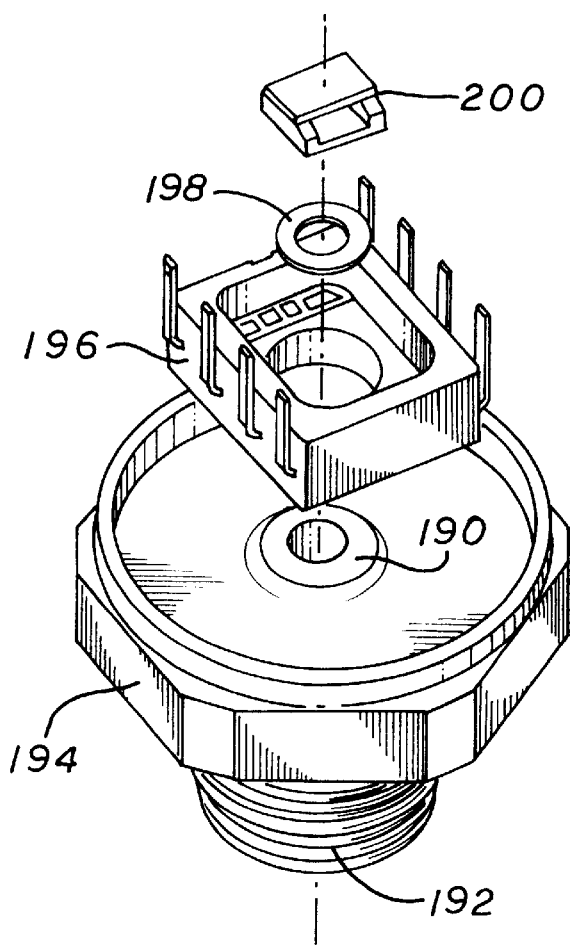
FIGS. 7a and 7b illustrate the silicon pressure sensor of FIGS. 3 and 4 hermetically attached to a metal pressure port having a threaded pipe fitting and a hex outline, according to another embodiment of the present invention.
Figure 7B:
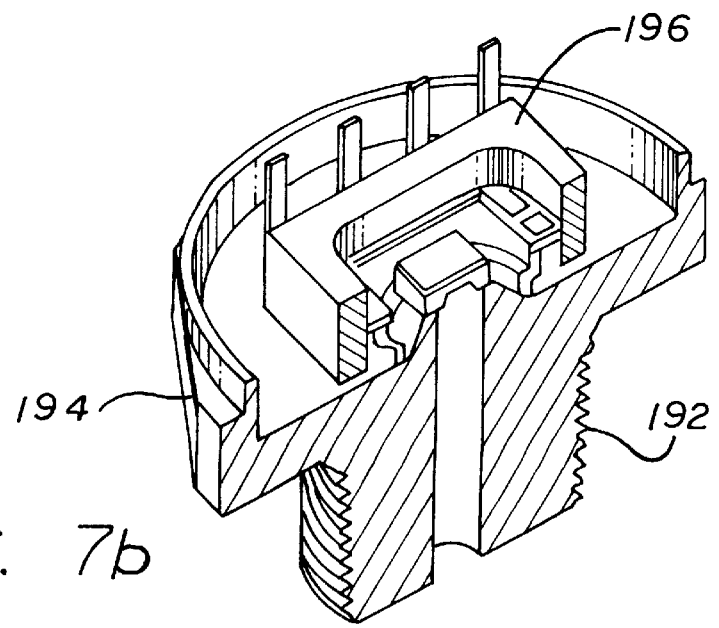

FIGS. 7a and 7b illustrates the silicon pressure sensor of FIGS. 3 and 4 hermetically attached to a metal pressure port 190 having a threaded pipe fitting 192 and a hex outline 194, according to another embodiment of the present invention. The pre-molded plastic package 196 has a metal insert ring 198 for aligning the silicon die 200 with the pressure port 190 during the die attach process, and mounting the pre-molded package to the metal port 190 via solder. This style of packaging allows for easy and flexible design changes to the pressure port independent of the tooling and assembly flow.

The present invention uses solder to attach the sensor element onto a metal pressure port in a low cost plastic packaging technology. In one embodiment, it is desirable to have the sensor die attached to the metal insert using non-organic die attach materials, such as solder, to provide better hermeticity and heat transfer, higher working temperature, etc. In the case of sensor packaging, the solder die attach provides a long term reliable solution for a hermetic pressure seal to the backside of the silicon sensor die.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hermetic media interface for a sensor package, comprising:
   a semiconductor die;
   a metal pressure port; and
   a eutectic solder coupled between the semiconductor die and the metal pressure port.

2. The hermetic media interface of claim 1, wherein the metal pressure port and the semiconductor die are housed in a pre-molded plastic package.

3. The hermetic media interface of claim 1, wherein a backside of the semiconductor die is metallized.

4. The hermetic media interface of claim 1, wherein a backside of the semiconductor die is metallized with chromium and platinum.

5. The hermetic media interface of claim 1, wherein the metal pressure port is made from one or more of the following: Invar, kovar, and brass.

6. The hermetic media interface of claim 1, wherein the metal pressure port is plated with one or more of the following: electroless nickel and gold.

7. The hermetic media interface of claim 1, wherein the eutectic solder includes gold and tin.

8. The hermetic media interface of claim 1, wherein the eutectic solder is made from 80% gold and 20% tin.

9. The hermetic media interface of claim 1, wherein the eutectic solder is made from 96.5% tin and 3.5% silver.

10. The hermetic media interface of claim 1, wherein the solder is applied in a paste form.

11. The hermetic media interface of claim 1, wherein the semiconductor die includes a deformable diaphragm and a frame region that surrounds the deformable diaphragm.

12. The hermetic media interface of claim 11, wherein the deformable diaphragm includes piezoresistors disposed thereon for sensing pressure.

13. The hermetic media interface of claim 11, wherein the semiconductor die incorporates a stress isolation flexible region between the frame region and the deformable diaphragm.

14. The hermetic media interface of claim 11, further comprising a cap having a recess, the cap being attached to the semiconductor die to form a cavity therebetween for allowing deflection of the deformable diaphragm.

15. The hermetic media interface of claim 14, wherein the cap is made from silicon.

16. The hermetic media interface of claim 14, wherein the cap further includes a second pressure port for providing a differential measurement.

17. The hermetic media interface of claim 2, wherein the metal pressure port is insert molded or inserted subsequent to the molding of the pre-molded package.

18. The hermetic media interface of claim 2, wherein the semiconductor die is attached to the metal pressure port independent of molding of the pre-molded plastic package.

19. The hermetic media interface of claim 1, wherein the solder is applied to the metal pressure port prior to the semiconductor die being reflowed to the metal pressure port.

20. A sensor system having a hermetic media interface, comprising:
   a semiconductor die;
   a metal pressure port;
      a pre-molded plastic package containing the semiconductor die; and
   a ring coupled between the metal pressure port and the semiconductor die to attach the same with the metal pressure port.

21. The system of claim 20, wherein the ring is a eutectic solder to solder the semiconductor die to the metal pressure port.

22. The system of claim 20, wherein the metal pressure port is made from one or more plastic materials, and the ring is a die-attach adhesive which includes one or more of the following: RTV and epoxy.

23. The system of claim 21, wherein the semiconductor die is metallized with chromium and platinum on a solder side.

24. The system of claim 20, wherein the metal pressure port is made from one or more of the following metals: Invar, kovar, and brass.

25. The system of claim 21, wherein the metal pressure port is plated with one or more of the following: electroless nickel and gold.

26. The system of claim 21, wherein the eutectic solder includes gold and tin.

27. The system of claim 21, wherein the eutectic solder is made from 80% gold and 20% tin.

28. The system of claim 21, wherein the eutectic solder is made from 96.5% tin and 3.5% silver.

29. The system of claim 20, wherein the semiconductor die includes a diaphragm region and a frame region surrounding the diaphragm region, the diaphragm region having piezoresistive elements disposed thereon to sense pressure.

30. The system of claim 29, wherein the semiconductor die incorporates an integral stress isolation region between the frame and diaphragm regions.

31. The system of claim 29, wherein the semiconductor die is attached to a silicon cap having a cavity to allow the deflection of the diaphragm region.

32. The system of claim 31, wherein the cap includes a second pressure port.

33. The system of claim 20, wherein the metal pressure port is incorporated into a housing having a threaded pipe fitting.

34. The system of claim 33, wherein the metal pressure port has features for crimping the housing to further protect the electronics.

35. A method of providing a hermetic media interface, comprising the combined acts of:
   providing a semiconductor die;
   metallizing a backside of the semiconductor die;
   soldering the semiconductor die to a metal pressure port using a eutectic solder; and
   housing the metal pressure port and semiconductor die in a pre-molded plastic package.

36. The method of claim 35 wherein soldering the semiconductor die comprises soldering the semiconductor die to the metal pressure port using the eutectic solder including a combination of tin and silver.

37. The method of claim 35 wherein soldering the semiconductor die comprises soldering the semiconductor die to the metal pressure port using the eutectic solder including a combination of gold and tin.

* * * * *